United States Patent
Uematsu et al.

(10) Patent No.: US 10,290,390 B2
(45) Date of Patent: May 14, 2019

(54) POLYMER BLENDS

(71) Applicant: BOREALIS AG, Vienna (AT)

(72) Inventors: Takashi Uematsu, Stenungsund (SE); Ola Fagrell, Stenungsund (SE); Asa Hermansson, Gothenburg (SE); Asa Linder, Gothenburg (SE)

(73) Assignee: BOREALIS AG, Vienna (AT)

( * ) Notice: Subject to any disclaimer, the term of this patent is extended or adjusted under 35 U.S.C. 154(b) by 116 days.

(21) Appl. No.: 15/120,721

(22) PCT Filed: Feb. 20, 2015

(86) PCT No.: PCT/EP2015/053554
§ 371 (c)(1),
(2) Date: Aug. 22, 2016

(87) PCT Pub. No.: WO2015/124701
PCT Pub. Date: Aug. 27, 2015

(65) Prior Publication Data
US 2017/0011817 A1    Jan. 12, 2017

(30) Foreign Application Priority Data
Feb. 21, 2014 (EP) .................. 14156143

(51) Int. Cl.
*H01B 1/24* (2006.01)
*C08K 3/04* (2006.01)
*C08L 43/04* (2006.01)
*H01B 3/44* (2006.01)
*C08L 23/08* (2006.01)
*H01B 7/02* (2006.01)

(52) U.S. Cl.
CPC ............... *H01B 3/441* (2013.01); *C08K 3/04* (2013.01); *C08L 23/0815* (2013.01); *C08L 23/0869* (2013.01); *C08L 43/04* (2013.01); *H01B 1/24* (2013.01); *H01B 7/0216* (2013.01); *H01B 7/0275* (2013.01); *C08L 2203/202* (2013.01); *C08L 2205/02* (2013.01); *C08L 2205/03* (2013.01); *C08L 2207/04* (2013.01); *C08L 2666/04* (2013.01)

(58) Field of Classification Search
None
See application file for complete search history.

(56) References Cited

U.S. PATENT DOCUMENTS

| | | | |
|---|---|---|---|
| 5,272,236 A | 12/1993 | Lai et al. | |
| 6,080,810 A * | 6/2000 | Ribarits | C08K 3/04 524/495 |
| 2010/0025073 A1 | 2/2010 | Fagrell et al. | |

FOREIGN PATENT DOCUMENTS

| | | |
|---|---|---|
| EP | 449939 B1 | 10/1991 |
| EP | 736065 B1 | 2/2000 |
| EP | 1634913 A1 | 3/2006 |
| EP | 1916672 B1 | 7/2010 |
| EP | 2164900 B1 | 5/2013 |
| EP | 2636690 A1 | 9/2013 |
| EP | 2657284 A1 | 10/2013 |
| KR | 10-1089629 B1 | 12/2011 |
| WO | 98014516 A1 | 4/1998 |
| WO | 02073630 A2 | 9/2002 |
| WO | 2009056408 A1 | 5/2009 |
| WO | 2012048927 A2 | 4/2012 |

OTHER PUBLICATIONS

International Search Report of International Application No. PCT/US2015/053554 dated Nov. 3, 2015.

* cited by examiner

*Primary Examiner* — Sheeba Ahmed
(74) *Attorney, Agent, or Firm* — Roberts Mlotkowski Safran Cole & Calderon, P.C.

(57) ABSTRACT

This invention relates to silane moisture curable polymer composition and more particularly, to such a polymer composition that is highly diluted by a non-silane containing component, while retaining good high temperatures properties. The invention is a polymer composition comprising a base resin comprising less than 59 wt % of a silane cross-linkable polyethylene (A), an thermoplastic polyolefin free from silane groups (B) wherein the polymer composition comprise a filler with a BET Nitrogen Surface Area larger than 3 $m^2/g$ (C). The invention also relates to a cable layer of such polymer composition suitably a semiconducting layer of a power cable.

16 Claims, No Drawings

POLYMER BLENDS

FIELD OF INVENTION

This invention relates to silane moisture curable polymer composition and more particularly, to such a polymer composition that is highly diluted by a non-silane containing component, while retaining good high temperatures properties. The invention also relates to a cable layer of such polymer composition suitably a semiconducting layer of a power cable.

BACKGROUND OF INVENTION

It is known to modify polymers for tailoring their properties. Crosslinking of polymers is one well known modification method in many end applications of polymers. Crosslinking of polymers, such as polyolefines, substantially contributes i.a. to heat and deformation resistance, creep properties, mechanical strength, as well as to chemical and abrasion resistance of a polymer. In wire and cable applications crosslinked polymers, such as crosslinked polyethylenes, are commonly used as a layer material, e.g. in insulating, semi-conducting and/or jacketing layers.

In wire and cable applications a typical cable comprises at least one conductor surrounded by one or more layers of polymeric materials. In power cables, including medium voltage (MV), high voltage (HV) and extra high voltage (EHV), said conductor is surrounded by several layers including an inner semiconductive layer, an insulation layer and an outer semiconductive layer, in that order. The cables are commonly produced by extruding the layers on a conductor. One or more of said layers are then typically crosslinked to achieve the desired properties to the end product cable typically the inner semiconductive and/or outer semiconductive layer.

A well known crosslinking method is crosslinking functional groups, e.g. by hydrolysing hydrolysable silane groups, which are linked to polymer, and subsequently condensing the formed silanol groups using a silanol condensation catalyst, for instance carboxylates of metals, such as tin, zinc, iron, lead and cobalt; organic bases; inorganic acids; and organic acids. The crosslinking of polymers via silane groups thereof is known as silane-crosslinking technology, and for hydrolysable silane groups also called as moisture curing technology. Silane groups can be introduced into the polymer structure 1) by copolymerisation of monomers, such as olefin monomers, with silane-moiety bearing comonomers, or 2) by grafting crosslinkable silane-moieties bearing compounds, such as unsaturated silane compounds with hydrolysable silane group(s), onto a polymer. Grafting is usually performed by radical reaction using free radical generating agents. Free radical generation using free radical generating agents is thus conventionally used e.g. (a) for crosslinking a polymer, i.a. for forming primarily interpolymer crosslinks (bridges) by radical reaction, (b) for grafting a polymer, i.e. for introducing compounds, such as said silane compounds, to a polymer chain (to backbone and/or side chains) by radical reaction, and also (c) for visbreaking a polymer, e.g. for modifying the rheological properties, such as melt flow rate (MFR), by radical reaction. When grafting silane groups containing compounds to polyethylene polymer using free radical generating agents, then also undesirable crosslinking thus occurs as an undesired side-reaction. Crosslinking increases the viscosity of the polyethylene and as a result also the MFR decreases. Highly viscous polymer is difficult to process, e.g. extrude, since high energy input is required in order to achieve sufficient mixing, i.e. homogeneity, and sufficient through-put (production rate) during the processing step. Higher energy-input and thus heat formed due to viscous material naturally can cause undesired degradation of the polymer. The crosslinking side-reaction brings therefore limitation to the amount of silane groups to be grafted, since the more silane groups is added the more free radical generating agent is needed, whereby also more crosslinking side-reactions take place resulting in increased viscosity (decreased MFR) of the polymer. Accordingly, in order to enable the sufficient processability the amount of crosslinkable silane groups and thus the resulting degree of crosslinking of the silane-grafted polyethylene must usually be kept relatively low. Said crosslinking degree can be expressed i.a. as gel content or by measuring hot set properties of the crosslinked polymer material. Thus in the prior art in order to maintain a sufficient processability, said degree of crosslinking of silane-grafted and silane-crosslinked polymers has conventionally been kept at a level which, when defined being the gel content of a crosslinked polymer, corresponds to a gel content of 25-30 wt %, when measured according to ASTM D2765-95 using a crosslinked polymer sample. E.g. semiconductive cable layer materials have typically a high filler, usually carbon black, content in order to provide the desired conductivity property, whereby said filler also increases the viscosity of the polymer material.

Furthermore, it has been found that certain type of carbon black may cause undesired premature crosslinking, known as scorch, which may occur during the production of cable layers resulting in lumps on cables due to too early and uneven gel formation. Such scorch may be probably due to surface properties of said carbon black. Thus in practice, the use of crosslinkable silane-grafted polymers of prior art has been limited, if used at all, in applications, such as in crosslinkable semiconductive layer materials. Accordingly, there is a continuous need for alternative polymer compositions suitable for different application areas.

Thus there is still a need for a simple process to prepare silane crosslinkable polymer composition with improved processability and flexibility which still meet tensile, elongation and cure state target specifications for semiconducting layers in power cables.

EP2164900 from Dow disclose a blend with at least 60 wt % of a silane containing polymer there the blend is diluted with a second component there the hot set decrease with increased amount of a plastomer component. Other patents teach addition of a thermoplastic polyolefin component, for example EP449939, EP736065 & EP1916672. None of them show that a sufficient crosslinking can be achieved.

BRIEF SUMMARY OF INVENTION

The invention is a polymer composition comprising a base resin comprising (A) less than 59 wt % of a silane crosslinkable polyethylene (B) an thermoplastic polyolefin free from silane groups wherein the polymer composition comprise (C) filler with a BET Nitrogen Surface Area larger than 3 $m^2/g$. Base resin is the polymer component of a polymer composition. Polymers are defined to have more than at least 1000 repeating units.

Silane crosslinkable means that a silanol condensation reaction can form covalent bonds with other silane groups. The covalent bonds will form a network and crosslink the polymer. The network degree can be measured by for example gel content and hot set. A thermoplastic is processable as a melt above a specific temperature, and returns to a solid state upon cooling.

Polyolefin means herein a polymer comprising of mainly ethylene and alfa-olefines (alkenes), typically ethylene, propylene, butylene, hexene and octene or mixtures thereof.

The invention is blending less than 59 wt % of a silane crosslinkable polyethylene (A) with a thermoplastic polyolefin free from silane groups (B) and a filler with a BET Nitrogen Surface Area larger than 3 $m^2/g$ (C). The polymer composition is suitably crosslinked with a condensation catalyst. Result is a silane crosslinked polymer composition with high gel content and good hot set properties that meet specifications for semiconducting layers in power cables. This is surprising as the added elastomer contains no crosslinkable or functional groups which can aid network formation. The invention is also adding a thermoplastic polyolefin free from silane groups (B) that allows to tailoring process parameters of the molten polymer composition as well as the physical properties of the crosslinked polymer composition.

It is an essential part of the invention that (B) is thermoplastic. This enables easy processability and good compounding with the silane crosslinkable polyethylene (A). The base resin can be in one phase (homogeneous) or in different phases (heterogeneous). The essence of the invention is a crosslinked network linking the polymer composition together. The term crosslinked can be described as hot set and/or gel content. These terms describe two different types of crosslinking behaviour. Hot set measuring the properties of the crosslinked polymer composition at elevated temperatures above the melting point of uncrosslinked silane crosslinkable polyethylene (A) and thermoplastic polyolefin, i.e. the thermoplastic polyolefin (B) will be in molten state if the system is a two phase system. Gel content measures soluble polymers from a crosslinked sample.

The filler (C) is an essential part of the invention. Fillers can help to increase mechanical properties. This is usually seen at lower temperatures, i.e. below melting point of the thermoplastic polyolefin (B), not at high temperatures in which hot set is measured. Gel content is not affected from fillers.

BET surface is measure of the physical adsorption of gas molecules on a solid surface and serves as the basis for an important analysis technique for the measurement of the specific surface area of a material. In other word it is a measurement of functionality of a surface. The higher surface area the more active can the surface be. In this invention it is important that the surface is activated, expressed as a high BET surface.

One embodiment of the invention is a cable comprising a layer in a cable, more specific a semiconducting layer in a cable, comprising an inner semiconducting layer, an insulation layer, an outer semiconducting layer and a jacket layer, wherein at least one semiconducting layer is made of a polymer composition with less than 59 wt % of a silane crosslinkable polyethylene (A) and an elastomer polyolefin free from silane groups (B) wherein the polymer composition comprise a filler with a BET Nitrogen Surface Area larger than 3 $m^2/g$ (C).

Another embodiment of the invention is a crosslinked article made from a polymer composition with less than 59 wt % of a silane crosslinkable polyethylene (A) and an thermoplastic polyolefin free from silane groups (B) wherein the polymer composition comprise a filler with a BET Nitrogen Surface Area larger than 3 $m^2/g$ (C). wherein the gel content is at least 40 wt % and the hot set measured at 0.2 MPa gives an elongation below 175% at 200° C.

DETAILED DESCRIPTION OF INVENTION

In one embodiment of the invention the silane crosslinkable polyethylene (A) is in an amount from 20 wt % to 55 wt %, suitably 20 to 50 wt % in the base resin.

One embodiment of the invention the silane crosslinkable polyethylene (A) is present in an amount from 30 wt % to 80 wt %, suitably 40 to 75 wt % in the base resin.

The total sum of base resin is 100 wt %. The base resin can comprise additional polymer components. It is essential part of the invention that no components except the silane crosslinkable polyethylene (A) comprise any silane groups.

The thermoplastic polyolefin free from silane groups (B) suitably is a thermoplastic elastomer polyethylene. Thermoplastic elastomers (TPE), sometimes referred to as thermoplastic rubbers, are a class of copolymers which consist of materials with both thermoplastic and elastomeric properties. TPE has three essential characteristics:

1. The ability to be stretched to moderate elongations and, upon the removal of stress, return to something close to its original shape.
2. Processable as a melt above a specific temperature, and returns to a solid state upon cooling.
3. Absence of significant creep.

The thermoplastic elastomer polyethylene should have a low crystallinity in order to be elastic. The degree of crystallinity is typically 40 wt % or below and can even be lower than 30 wt %.

The definition of polyethylene is a polymer with more than 50 wt % of ethylene monomer. The polyethylene can further comprise alfa-olefines and comonomers with vinyl group(s) and functional group(s) such as polar comonomers.

In one embodiment of the invention the thermoplastic polyolefin free from silane groups (B) is a thermoplastic elastomer polyethylene, such as a polyethylene copolymer, more suitably a polar polyethylene copolymer (D) or plastomer (E) or a mixture thereof. The plastomer (E) can be a polyolefin, suitable a polyethylene copolymer. Most suitably the thermoplastic polyolefin free from silane groups (B) is a mixture of a polar polyethylene copolymer (D) and a polyethylene copolymer plastomer (E).

The polar polyethylene copolymers (D) have comonomers with polar groups. Examples of polar comonomers are: (a) vinyl carboxylase esters, such as vinyl acetate and vinyl pivalate, (b) (meth)acrylates, such as methyl(meth)acrylate, ethyl(meth)acrylate, butyl(meth)acrylate and hydroxyethyl (meth)acrylate, (c) olefinically unsaturated carboxylic acids; such as (meth)acrylic acid, maelic acid and fumaric acid, (d) (meth)acrylic acid derivatives, such as (meth)acrylonitrile and (meth)acrylic amide, and (e) vinyl ethers, such as vinyl methyl ether and vinyl phenyl ether. The polar ethylene is produced by a high-pressure polymerisation with free radical initiation.

One embodiment is using comonomers, vinyl esters of monocarboxylic acids having 1 to 4 carbon atoms, such as vinyl acetate (EVA), and (meth)acrylates of alcohols having 1 to 4 carbon atoms, such as methyl (meth)acrylate (EMA & EMMA). Especially suitable comonomers are butyl acrylate (EBA), ethyl acrylate (EEA) and methyl acrylate (EMA). Two or more such olefinically unsaturated compounds may be used in combination. The term "(meth)acrylic acid" is intended to embrace both acrylic acid and methacrylic acid.

The amount of polar group containing monomer units in the polar polyethylene copolymer (D) is 5 to 40 wt. %, in suitably 10 to 30 wt. %, and yet more suitably between 15 and 30 wt. %.

In one embodiment the total amount of polar comonomers, excluding silane groups, in the base resin is from 1 wt % to 20 wt %, suitably 5 wt % to 15 wt %. The polar monomer suitably is selected from EVA, EBA, EMA, EMMA & EEA or mixtures thereof, most suitably from EBA, EMA and EEA.

Plastomer (E) means herein a very low density polyolefin, more preferably very low density polyolefin polymerised using single site, preferably metallocene catalysis. Typically, the polyolefin plastomer (E) are ethylene copolymers. These polyolefin plastomers (E) usually have a density of less than or equal to 0.91 g/cm$^3$, more suitably less than or equal to 0.905 g/cm$^3$. The density usually is above 0.860 g/cm$^{3'}$ more suitably more than 0.880 g/cm$^3$. Preferable, the polyolefin plastomers (E) have a melt flow rate, of less than about 50 g/10 min, suitably between 0.3 and 20/10 min and more suitably between 0.5 and 20/10 min.

In one preferred embodiment the polyolefin elastomers (E) are prepared with at least one metallocene catalyst. The plastomer (E) resin may also be prepared with more than one metallocene catalyst or may be a blend of multiple plastomer resins prepared with different metallocene catalysts. In some embodiments, the plastomer (E) is a substantially linear ethylene polymer (SLEP). SLEPs and other metallocene catalysed plastomers (E) are known in the art, for example, U.S. Pat. No. 5,272,236. These resins are also commercially available, for example, as Queo™ plastomers available from *Borealis*, ENGAGE™ plastomer resins available from Dow Chemical Co. or EXACT™ polymers from Exxon or TAFMER™ polymers from Mitsui.

In one embodiment, the polyolefin elastomer is suitably incompatible (i.e., immiscible) with the silane-functionalized polymer. This is in contrast to prior art systems that either rely on a radical grafting process or cover blends of silane copolymer with crystalline polyethylenes which are mutually compatible. The final blend has excellent cure performance, mechanical properties and flexibility.

The filler (C) is suitably present in an amount from 1 to 40 wt %, suitably 25 to 40 wt %. The filler (C) is suitable as carbon black. In one embodiment of the invention the filler (C) is a furnace black or acetylene black with a surface area of 30-80 m$^2$/g measured determined by nitrogen absorption. In one embodiment the carbon blacks are electrically conductive, e.g. carbon blacks grades described with ASTM Nxxx codes, acetylene black, furnace black and Ketjen black. Examples of suitable carbon blacks are disclosed e.g. in WO 98/014516, another example is UV carbon black.

In one embodiment of the invention the polymer composition has a total amount of silane groups below 1 wt %, suitable below 0.8 wt %. In yet another embodiment of the invention the total amount of silane groups is below 0.6 wt %, the minimum amount of silane groups is at least 0.1 wt % and suitably 0.3 wt %. One effect of the invention is that the total amount of silane can lowered while maintaining good crosslinking properties such as hot set and gel content. The amount of silane groups are measured according to as described in the measurement methods example part comonomer content of functional silane.

One aspect of the invention is to reduce the total amount of silane groups in the base resin. The benefit is less amount of reactive silane groups in the polymer composition. This will reduce overall cost of the polymer composition. The molten polymer has properties of the thermoplastic polyolefin and the crosslinked polymer composition has the properties of ordinary silane crosslinked polymer composition (not diluted). Decreasing total amount of silane groups will improve thermal aging properties of the polymer composition.

The silane cross linkable polyethylene (A) can be made by many conventional processes. The hydrolysable silane groups may be introduced into the polyethylene by copolymerisation of e.g. ethylene monomers with silane group containing comonomer(s) or by grafting, i.e. by chemical modification of the polymer by addition of slime groups mostly in a radical reaction, Grafting is commonly used and the polymers are widely used. Benefits of copolymerisation are that no polar peroxide residues or unreacted vinyl silanes are present in the final article. This will make the final product more uniform, better consistency and improve quality. Storage stability of the copolymerised ethylene with vinyl triethoxy silane and/or vinyl trimethoxy silane made in a high pressure radical process is greatly improved compared to grafted solutions. Another benefit is less handling liquid vinyl silanes which are flammable and have a strong odour. Further benefits are less scrape, less scorch (premature crosslinking in extruder) and longer production runs (less cleaning of extruders). Copolymerised is the preferred production process.

In one embodiment no peroxide has been added in the polymer composition. This embodiment requires that the hydrolysable silane groups are introduced into the silane crosslinkable polyethylene (A) by copolymerisation.

The silane group(s) containing comonomer for copolymerising silane groups or the silane group(s) containing compound for grafting silane groups to produce polyolefin (a) is preferably an unsaturated silane compound represented by the formula.

$$R^1SiR^2_qY_{3-q} \tag{I}$$

wherein
R$^1$ is an ethylenically unsaturated hydrocarbyl, hydrocarbyloxy or (meth)acryloxy hydrocarbyl group,
each R$^2$ is independently an aliphatic saturated hydrocarbyl group,
Y which may be the same or different, is a hydrolysable organic group and
q is 0, 1 or 2.

Special examples of the unsaturated silane compound are those wherein R$^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and R$^2$, if present, is a f wherein R$^1$ is vinyl, allyl, isopropenyl, butenyl, cyclohexanyl or gamma-(meth) acryloxy propyl; Y is methoxy, ethoxy.

One embodiment is copolymerising the ethylene with vinyl triethoxy silane or vinyl trimethoxy silane in a high pressure reactor to produce the silane crosslinkable polyethylene (A).

In a particularly embodiment, the crosslinkable polyethylene (A) with hydrolysable silane groups at the same time also contains the polar groups in any of the embodiments as described hereinbefore (polar polyethylene copolymers), i.e. the polyethylene is a terpolymer containing both the silane groups and the polar groups.

Furthermore, the amounts for the silane group and the polar group containing monomers as described above apply for the terpolymer. Then the silane crosslinkable polyethylene (A) is terpolymer the thermoplastic polyolefin free from silane groups (B) suitably is a plastomer (E).

Such terpolymers may be produced by grafting, or, by copolymerisation of olefin monomers and unsaturated monomers containing silane groups and polar groups.

In one embodiment of the invention a condensation catalyst (F) is present. The condensation catalyst can be added as a master batch, or by migration, or as a liquid by direct injection in to an extruder, such as a cable extruder or mix the condensation catalyst with the polymer composition and feed the mixture to the extruder, such as a cable extruder. The decisive factor is the activity of the condensation catalyst. The amount of catalyst sufficient to cure the silane-functionalized polymer will generally depend on the specific type selected, but will preferably range from about 0.01 to 0.5 parts by weight per 100 parts by weight of the silane polymer.

Accordingly, the present invention also pertains to a master batch for a crosslinkable polyolefin composition comprising a matrix polymer and a silanol condensation catalyst (B) in any of the above described embodiments.

The matrix polymer can be a polyolefin, more suitable a polyethylene, which may be a homo- or copolymer of ethylene, e.g. low density polyethylene, or polyethylene-methyl-, -ethyl, or -butyl-acrylate copolymer containing 1 to 50 wt. % of the acrylate, and mixtures thereof.

As stated, in the master batch the compounds to be added to the silane group containing polyolefin are contained in concentrated form, i.e. in a much higher amount than in the final composition.

The master batch comprises the condensation catalyst (F) in an amount of from 0.3 to 15 wt %, more suitably from 0.7 to 10 wt %.

Furthermore, the master batch can contain some or all of the additives, for example the stabilizers.

The amount of the stabilizers contained in the master batch can be up to 10 wt %.

The master batch is compounded with the silane group containing polymer in an amount of from 1 to 10 wt %, more suitably from 2 to 8 wt %, most suitably 5 wt %.

Compounding may be performed by any known compounding process, including extruding the final product with a screw extruder or a kneader.

The condensation catalyst can be added to the polymer composition by migration. This is accomplished by allowing the condensation catalyst for example to migrate from another layer that is in direct contact with the layer that shall be crosslinked.

One embodiment of the invention relates to a process for adding a condensation catalyst to an extruder comprising feeding the extruder with a crosslinkable polyethylene (A) with hydrolysable silane groups and add a liquid condensation catalyst as by direct injection in to an extruder, such as a cable extruder, extrude said mixture of crosslinkable polyethylene with hydrolysable silane groups and liquid condensation catalyst and form an article and crosslink said article.

Another embodiment of the invention relates to a process for adding a condensation catalyst to an extruder comprising mix the crosslinkable polyethylene (A) with hydrolysable silane groups and the thermoplastic polyolefin (B) and the liquid condensation catalyst in a pre mixer prior to the extruder, such as a cable extruder, extrude said mixture and form an article and crosslink said article. The crosslinkable polyethylene (A) with hydrolysable silane groups and the thermoplastic polyolefin (B) can be as separate pellets or be pre-compounded in a separate step.

The polymer composition according to the invention may further contain various additives, such as, antioxidants, further stabilizers e.g. process stabilizers, scorch retardants, lubricants, colouring agents, drying agents and foaming agents.

In one embodiment is the sum of the weight percent of the crosslinkable polyethylene (A) with hydrolysable silane groups and the thermoplastic polyolefin (B) more than 80 wt % and more suitably more than 90 wt % and even more suitably more than 95% in the base resin.

The present invention furthermore relates to a wire or cable layer, in particular a medium or high voltage cable, comprising the polymer composition in any of the above described embodiments. The cable suitably is a power cable.

The invention relates to a medium or high voltage cable comprising one or more conductors in a cable core, an inner semiconducting layer, followed by an insulating layer, and an outer semiconducting layer and a jacket layer, wherein at the semiconducting layer, comprises the polymer composition in any of the above described embodiments. The volume resistivity of an inventive semiconductive polymer composition can be 5000 Ω-cm or below, more preferably to 1000 Ω-cm or below, or in some applications even to 100 Ω-cm or below, as determined according to ASTM D 991 and/or ISO 3915.

In one embodiment of the invention the semiconducting layer is the inner semiconducting layer. This is beneficial since less silane needs moisture curing to achieve a high crosslinking degree utilizing a polymer composition according to the invention. This translates to a faster and more efficient curing.

In addition to the semiconductive and insulating layers, further layers may be present in medium or high voltage cables, such as a metallic tape or wire shield, and, finally, an outermost jacketing layer.

Usually, the cable is produced by co-extrusion of the different layers onto the conducting core. Then, cross-linking is performed by moisture curing, wherein in the presence of the silanol condensation catalyst the silane groups are hydrolysed under the influence of water or steam, resulting in the splitting off of alcohol and the formation of silanol groups, which are then cross-linked in a condensation reaction wherein water is split off.

The invention relates to a crosslinked article according to any polymer compositions above wherein the gel content is at least 40 wt % and the hot set measured at 0.2 MPa gives an elongation at break below 100% at 200° C., suitably an elongation below 175% at 200° C. The article can be a layer in a cable described as above, such as a semiconducting layer.

Usually, moisture curing is performed in a sauna or water bath at temperatures of 70 to 100° C. or ambient.

The invention relates to a process for making a cable layer comprising a base resin with less than 59 wt % of a silane crosslinkable polyethylene (A) and a thermoplastic polyolefin free from silane groups (B) wherein the base resin and a filler with a BET Nitrogen Surface Area larger than 3 $m^2/g$ (C) is mixed in a cable extruder, extruded in to a cable layer and consequently crosslinked by a condensation reaction, preferably using a condensation catalyst (F).

The following examples serve to further illustrate the present invention.

EXAMPLES

Measurement Methods a) Melt Flow Rate

The melt flow rate MFR2 was measured in accordance with ISO 1133 at 190° C. and a load of 2.16 kg for ethylene homo and copolymers.

b) Density: The density was measured according to ISO 1183D and ISO 1872-2 for sample preparation.

c) Melting temperature, crystallization temperature (Tcr), and degree of crystallinity: The melting temperature Tm of the used polymers was measured in accordance with ASTM D3418. Tm and Tcr were measured with Mettler TA820 differential scanning calorimetry (DSC) on 3±0.5 mg samples. Both crystallization and melting curves were obtained during 10° C./min cooling and heating scans between −10 to 200° C. Melting and crystallization temperatures were taken as the peaks of endotherms and exotherms.

The degree of crystallinity was calculated by comparison with heat of fusion of a perfectly crystalline polymer of the same polymer type, e.g. for polyethylene, 290 J/g.

d) Comonomer content:

Content (wt-%) of functional silane groups ($SiR^2_q Y_{3-q}$) (as defined in formula I and II) using X-ray fluorescence analysis: The pellet sample was pressed to a 3 mm thick plaque (150° C. for 2 minutes, under pressure of 5 bar and cooled to room temperature). Si-atom content was analysed by XRF, PW1480/10 (supplied by Phillips). The XRF results show the total content (wt %) of Si and are then calculated and expressed herein as wt %-Content of functional silane groups ($SiR^2_q Y_{3-q}$).

Content (wt % and mol %) of polar comonomer: Comonomer content (wt %) of the polar comonomer was determined in a known manner based on Fourier transform infrared spectroscopy (FTIR) determination calibrated with 13C-NMR as described in Haslam J, Willis H A, Squirrel D C. Identification and analysis of plastics, 2nd ed. London Iliffe books; 1972. FTIR instrument was a Perkin Elmer 2000, 1 scann, resolution 4 cm-1. The peak for the used comonomer was compared to the peak of polyethylene as evident for a skilled person (e.g. the peak for butyl acrylate at 3450 cm-1 was compared to the peak of polyethylene at 2020 cm-1). The weight-% was converted to mol-% by calculation based on the total moles of polymerisable monomers.

An alternative method to determine silane and polar comonomer content: is to use NMR-method which would give equal results to above X-ray and FTIR method, i.e. results would be comparable to purposes of the invention: Comonomer Content (NMR): The comonomer content was determined by using 13C-NMR. The 13C-NMR spectra were recorded on Bruker 400 MHz spectrometer at 130° C. from samples dissolved in 1,2,4-trichlorobenzene/benzene-d6 (90/10 w/w).

e) Gel content (wt %): is measured according to ASTM D2765-90 using a sample consisting of said silane-crosslinked polyolefin polymer composition of the invention (Method A, decaline extraction).

f) Hot set elongation (%): To determine that the cross-linkable polyethylene composition are properly cured the hot set elongation and permanent set are determined according to IEC 60811-2-1, by measuring thermal deformation at 200° C. and at a load of 0.1 MPa using a cable layer sample consisting of said silane-crosslinked polyolefin composition of the invention. In the preferred embodiment of the invention a load of 0.2 MPa is used. Two dumb-bell test samples are prepared from a tape consisting of a polyolefin composition to be tested by cutting test samples from the tape. Each test sample is fixed vertically from upper end thereof in the oven and the load of 0.1 MPa or, 0.2 MPa are attached to the lower end of each test layer sample. After 15 min, 200° C. in oven the distance between the premarked lines is measured and the percentage hot set elongation calculated, elongation %. For permanent set %, the tensile force (weight) is removed from the test samples and after recovered in 200° C. for 5 minutes and then let to cool in room temperature to ambient temperature. The permanent set % is calculated from the distance between the marked lines.

g) BET Nitrogen Surface Area is measured according to ASTM D3037.

Base Resins:

EVS (1.75%) BA (17%) Terpolymer produced by a high-pressure polymerisation with free radical initiation, where ethylene monomers were reacted with vinyl trimethoxysilane (VTMS) and butylacrylate (BA) co-monomers amounts so as to yield 1.75 wt % silane content and 17 wt % BA content in the terpolymer. The melt flow rate (MFR2@190° C.) according to ISO 1133 (190° C., 2.16 kg) which is 5 g/10 min EVS (1.75%) BA (8%) Terpolymer produced by a high-pressure polymerisation with free radical initiation, where ethylene monomers were reacted with vinyl trimethoxysilane (VTMS) and butylacrylate (BA) co-monomers amounts so as to yield 1.75 wt % silane content and 8 wt % BA content in the terpolymer. The melt flow rate (MFR2@190° C.) according to ISO 1133 (190° C., 2.16 kg) which is 5 g/10 min LDPE: A low density PE homopolymer, commercially available from *Borealis* with a melt flow rate (MFR2@190 C) of 2 g/10 min, according to ISO 1133 (190° C., 2.16 kg).

EVS (1.9 wt %): VTMS-ethylene copolymer produced by a high-pressure polymerisation with free radical initiation, where ethylene monomers were reacted with vinyl trimethoxysilane (VTMS) amounts so as to yield 1.9 wt % silane content in the copolymer. The melt flow rate (MFR2@190° C.) according to ISO 1133 (190° C., 2.16 kg) which is 1 g/10 min EBA (17 wt %): Ethylene butyl acrylate (EBA) copolymer, having a melt flow rate (MFR2@190° C.) according to ISO 1133 (190° C., 2.16 kg) which is 7 g/10 min and the content of butyl acrylate which is 17 wt % with regard to the total amount of monomers for the EBA. The saturated polyolefin were prepared by a high pressure polymerisation process.

Queo 0210: Copolymer of ethylene and 1-octene having a density of 902 kg/m³ and a melt flow rate according to ISO 1133 (190° C., 2.16 kg) which is 10 g/10 min. The polymer is produced with a metallocene catalyst in a solution polymerisation process. It is commercially availible from *Borealis*.

Exact 9061: Copolymer of ethylene and 1-butene having a density of 863 kg/m³ and a melt flow rate according to ISO 1133 (190° C., 2.16 kg) which is 0.55 g/10 min. The polymer is produced with a metallocene catalyst in a solution polymerisation process. It is commercially availible from ExxonMobil Chemical.

Exact 9361: Copolymer of ethylene and 1-butene having a density of 864 kg/m³ and a melt flow rate according to ISO 1133 (190° C., 2.16 kg) which is 3.5 g/10 min. The polymer is produced with a metallocene catalyst in a solution polymerisation process. It is commercially availible from ExxonMobil Chemical.

Catalyst Masterbatches

DOTL MB: Catalyst masterbatch consisting of 98% EBA (17 wt %): 0.6% dioctyltin dilaurate, 0.5% 4,4'-Thiobis(6-tert-butyl-m-cresol), 0.4% Pentaerythritol tetrakis(3-(3,5-di-tert-butyl-4-hydroxyphenyl)propionate) and 0.5% hexadecyltrimethoxysilane.

DBSA MB: Catalyst masterbatch consisting of 88.1% ethylene butyl acrylate (EBA) copolymer BAR717 with 1.5% dodecylbenzene sulfonic acid, 6.4% butylated reaction product of p-creasol and dicyclopentadiene, 3% hexadecyltrimethoxysilane and 1% montanic esters.

Carbon Black:

N550-Type. Commercial Furnace black, Iodine: 38 to 48 mg/g, DPBA: 115 to 127 ml/100 g, ash content: 0.1%

Antioxidant:

TMQ: commercially available grade of an antioxidant being 2,2,4-trimethyl-1,2-dihydroquinoline (CAS 26780-96-1)

Compounding and Extrusion of Tape

The blends are compounds of EVS copolymer, elastomer polymers, carbon black and anti oxidants 1.8 mm thick tapes consisting of 95% the polymer composition and 5% of a catalyst masterbatch have been extruded using the temperature settings 150° C./160° C./170° C. and a screw speed of 50 rpm. The tapes were crosslinked for 24 hours in 80° C. water bath before hot set and gel content were measured. This is to be seen as complete condensation reaction in the polymer composition.

two blends are low and the samples elongate until break during hot set testing, as one would expect when diluting an EVS polymer with a large amount of thermoplastic polymer.

Inventive examples 1 and 2 are base resin blends of EVS copolymer, EBA copolymer and additionally carbon black filler. Out of these two, inventive example 1 has the highest EVS content and also the best crosslinking performance (gel content and hot set). However, both these show a surprisingly good crosslinking performance considering the low EVS content in the formulations. Both inventive 1 and 2 contain less EVS than reference formulations 2 and 3, but show a much higher degree of crosslinking and a low hot set elongation. Inventive examples 3 and 4, which are blends of EVS copolymer, polyolefin plastomer (E), a small amount of EBA and carbon black filler, also show the same surprisingly high degree of crosslinking in combination with a low hot set elongation.

The invention claimed is:

1. A polymer composition comprising a base resin comprising
    (A) less than 59 wt % of a silane crosslinkable polyethylene;
    (B) a thermoplastic polyolefin free from silane groups that is a thermoplastic elastomer polyethylene;
    wherein the polymer composition comprises
    (C) a filler with a BET Nitrogen Surface Area larger than 3 m$^2$/g.

| Base resin wt % | Ref 1 | Ref 2 | Ref 3 | Ref 4 | Inv 1 | Inv 2 | Inv 3 | Inv 4 |
|---|---|---|---|---|---|---|---|---|
| EVS (1.75%) BA (17%) | 66 | | | | | | | |
| EVS (1.75%) BA (8%) | | | | 66 | | | | |
| LDPE | 34 | | | 34 | | | | |
| EVS (1.9 wt %) | | 50 | 50 | | 40 | 30 | 30 | 40 |
| EBA (17 wt %) | | | | | 60 | 70 | 10 | 9 |
| Queo 0210 | | | | | | | 60 | 51 |
| Exact 9061 | | 50 | | | | | | |
| Exact 9361 | | | 50 | | | | | |
| Additional components added in wt % | | | | | | | | |
| Base resin | 71 | 100 | 100 | 63.5 | 32.2 | 32.2 | 61.6 | 63 |
| N550 | 28 | | | 35.5 | 37 | 37 | 37.5 | 36 |
| TMQ | 0.95 | | | 0.95 | 0.8 | 0.8 | 0.95 | 0.95 |
| Tape extrusion | | | | | | | | |
| Base resin + filler + additive | 95 | 95 | 95 | 95 | 95 | 95 | 95 | 95 |
| DOTL MB | 5 | | | 5 | 5 | 5 | 5 | 5 |
| DBSA MB | | 5 | 5 | | | | | |
| Tape properties | | | | | | | | |
| Hot set, 0.1 MPa, 200° C. [%] | 22.9 | — | — | — | 28.3 | 42.9 | 42.8 | — |
| Hot set, 0.2 MPa, 200° C. [%] | 42.1 | 123 | 162 | 25.3 | 49 | 62.4 | 62.9 | 62.0 |
| Gel content [%] | 65 | 40 | 40 | 68 | 56 | 52 | 51 | 54 |
| Elongation at break [%] | 281 | — | — | 183 | 126 | 154 | 190 | 234 |

Table 1 describes the formulations and technical results for four reference examples and four examples of the invention. Reference examples 1 and 4 are based on ethylene/vinyl silane/butyl acrylate terpolymers. These formulations contain the largest amount of silane groups, and thus give the best crosslinking performance of all the example formulations. Reference 2 and 3 are blends between silane crosslinkable polymer (A) and a plastomer (E), with no filler (C) included in the formulation. The gel content for these 2. The polymer composition according to claim 1 wherein the silane crosslinkable polyethylene (A) is in an amount from 20 wt % to 55 wt %.

3. The polymer composition according to claim 1 wherein the thermoplastic polyolefin free from silane groups (B) is present in an amount from 30 wt % to 80 wt %.

4. The polymer composition according to claim 1 wherein the thermoplastic polyolefin free from silane groups (B) is a thermoplastic elastomer polyethylene.

5. The polymer composition according to claim 1 wherein the thermoplastic polyolefin free from silane groups (B) is a mixture of polar polyethylene copolymer (D) and plastomer (E).

6. The polymer composition according to claim 1 wherein the total amount of polar comonomers, excluding silane groups, in the base resin is from 1 wt % to 20 wt %.

7. The polymer composition according to claim 5 wherein the polar copolymer (D), excluding silane groups, is selected from EVA, EBA, EMA, EMMA & EEA.

8. The polymer composition according to claim 1 wherein the filler (C) is present in an amount from 1 to 40 wt % of the polymer composition.

9. The polymer composition according to claim 8 wherein the filler (C) is a carbon black.

10. The polymer composition comprising a base resin according to claim 1 wherein the total amount of silane groups in the base resin is below 0.8 wt %.

11. The polymer composition according to claim 1 wherein a condensation catalyst (F) is present.

12. The polymer composition according to claim 11 wherein the condensation catalyst (F) is added as
a master batch
or by migration
or as a liquid by direct injection into an extruder;
or by mixing the condensation catalyst with the polymer composition and feed the mixture to the extruder, such as a cable extruder.

13. A cable or wire layer made of the composition according to claim 1 suitably a power cable.

14. A cable comprising a semiconducting layer in a cable, comprising an inner semiconducting layer, an insulation layer, an outer semiconducting layer and a jacket layer, wherein at least one semiconducting layer is made of a polymer composition according to claim 1.

15. A crosslinked article comprising a polymer composition according to claim 1 wherein the gel content is at least 40 wt % and the hot set measured at 0.2 MPa gives an elongation at break below 175% at 200° C.

16. A process for producing a cable layer comprising mixing a base resin comprising
(A) less than 59 wt % of a silane crosslinkable polyethylene;
(B) a thermoplastic polyolefin free from silane groups that is a thermoplastic elastomer polyethylene;
with
(C) a filler with a BET Nitrogen Surface Area larger than 3 $m^2/g$; in a cable extruder to form a mixture, extruding the mixture into a cable layer and crosslinking the mixture by a condensation reaction.

* * * * *